(12) United States Patent
Prokopowicz et al.

(10) Patent No.: US 10,988,089 B2
(45) Date of Patent: Apr. 27, 2021

(54) SLIDABLE OPERATOR-DISPLAY SUPPORT

(71) Applicant: Manitou Equipment America, LLC, West Bend, WI (US)

(72) Inventors: Alexander Roman Prokopowicz, West Bend, WI (US); Justin D. Bottoni, Campbellsport, WI (US)

(73) Assignee: Manitou Equipment America, LLC, West Bend, WI (US)

( * ) Notice: Subject to any disclaimer, the term of this patent is extended or adjusted under 35 U.S.C. 154(b) by 0 days.

(21) Appl. No.: 16/552,782

(22) Filed: Aug. 27, 2019

(65) Prior Publication Data
US 2021/0061182 A1 Mar. 4, 2021

(51) Int. Cl.
| | | |
|---|---|---|
| *F16M 11/00* | (2006.01) | |
| *B60R 11/02* | (2006.01) | |
| *F16M 13/02* | (2006.01) | |
| *B60R 11/00* | (2006.01) | |

(52) U.S. Cl.
CPC ....... *B60R 11/0229* (2013.01); *F16M 13/022* (2013.01); *B60R 2011/0003* (2013.01); *B60R 2011/0084* (2013.01)

(58) Field of Classification Search
CPC ....... F16M 13/02; F16M 11/041; F16M 11/00
See application file for complete search history.

(56) References Cited

U.S. PATENT DOCUMENTS

| | | |
|---|---|---|
| 3,555,168 A | 1/1971 | Frykberg |
| 3,726,178 A | 4/1973 | Dimity |
| 3,910,588 A | 10/1975 | Austin |

(Continued)

FOREIGN PATENT DOCUMENTS

| | | |
|---|---|---|
| CA | 1143403 | 3/1983 |
| CA | 1174490 | 9/1984 |

(Continued)

OTHER PUBLICATIONS

SWM, "Polyurethane Gelpad and Foam," accessed on Internet Aug. 27, 2019 [https://www.swmintl.com/products/composites/polyurethane-gelpad-and-foam], 2 pages.

(Continued)

*Primary Examiner* — Amy J. Sterling
(74) *Attorney, Agent, or Firm* — Reinhart Boerner Van Deuren s.c.

(57) ABSTRACT

A mounting arrangement includes a first bracket, a second bracket including a slot, and a series of washers, with two resilient washers. First and second bolts extend through the first bracket, a first and second of the washers, the slot of the second bracket, a third and fourth of the washers, the resilient washers, and a fifth and sixth of the washers. The second bracket frictionally engages the first and second washers, and frictionally engages the third and fourth washers. The resilient washers are each located between the respective first, second, third and fourth washers, and the fifth and sixth washers. The bolts are engaged by nuts compressing the first and second resilient washers with a compressive force between the washers, supporting the first bracket and the second bracket relative to each other and permitting the first bracket and the second bracket to slide relative to each other.

20 Claims, 7 Drawing Sheets

(56) References Cited

U.S. PATENT DOCUMENTS

| | | | |
|---|---|---|---|
| 4,067,184 A * | 1/1978 | Johnson, Jr. | F16F 1/3732 |
| | | | 57/135 |
| 4,280,390 A | 7/1981 | Murray | |
| 4,660,538 A * | 4/1987 | Burgard | F41B 5/1426 |
| | | | 124/88 |
| 5,431,518 A | 7/1995 | Young et al. | |
| 5,433,568 A | 7/1995 | Thaler | |
| 5,865,583 A | 2/1999 | Krawczak et al. | |
| 6,244,807 B1 | 6/2001 | Garcia | |
| 6,283,691 B1 | 9/2001 | Bogatz et al. | |
| 6,530,577 B1 | 3/2003 | Busby et al. | |
| 6,736,406 B1 | 5/2004 | Provencher | |
| 6,784,363 B2 | 8/2004 | Jones | |
| 7,229,516 B2 | 6/2007 | Busby et al. | |
| 8,759,692 B2 | 6/2014 | Bunyan et al. | |
| 8,766,108 B2 | 7/2014 | Bunyan et al. | |
| 9,016,697 B2 | 4/2015 | Boyd et al. | |
| 9,022,337 B2 * | 5/2015 | Petruskavich | F16M 11/041 |
| | | | 248/176.1 |
| 9,702,464 B1 | 7/2017 | Busby et al. | |
| 9,976,591 B2 | 5/2018 | Lambert et al. | |
| 10,150,555 B2 | 12/2018 | Boyd et al. | |
| 2013/0177364 A1 | 7/2013 | Orlando et al. | |
| 2014/0312574 A1 | 10/2014 | Busby et al. | |
| 2014/0334868 A1 | 11/2014 | Apfel | |
| 2015/0083877 A1 * | 3/2015 | Sears | F16M 13/02 |
| | | | 248/284.1 |
| 2015/0252903 A1 | 9/2015 | Boyd et al. | |
| 2016/0033043 A1 | 2/2016 | Busby et al. | |
| 2016/0208919 A1 | 7/2016 | Dry et al. | |
| 2018/0186456 A1 * | 7/2018 | Hess | B64D 11/00152 |
| 2019/0112026 A1 | 4/2019 | Boyd et al. | |
| 2019/0120384 A1 | 4/2019 | Boyd et al. | |

FOREIGN PATENT DOCUMENTS

| | | |
|---|---|---|
| GB | 640487 | 7/1950 |
| GB | 724375 | 2/1955 |
| GB | 750780 | 6/1956 |
| GB | 883909 | 12/1961 |
| GB | 963025 | 7/1964 |
| GB | 1018467 | 1/1966 |
| GB | 1119747 | 7/1968 |
| GB | 1219868 | 1/1971 |
| GB | 1284078 | 8/1972 |
| WO | WO 2010/135249 | 11/2010 |
| WO | WO 2013/028550 | 2/2013 |
| WO | WO 2015/168118 | 11/2015 |

OTHER PUBLICATIONS

Dattelbaum et al., "Shock compression of polyurethane foams," EDP Sciences, EPJ Web of Conferences 26, 02014 (2012), accessed on Internet Aug. 27, 2019 [https://www.epj-conferences.org/articles/epjconf/pdf/2012/08/epjconf_dymat2012_02014.pdf], 6 pages.

* cited by examiner

SLIDABLE OPERATOR-DISPLAY SUPPORT

BACKGROUND OF THE INVENTION

The present disclosure relates generally to the field of sliding joints. The present disclosure relates specifically to a mounting arrangement for slidably mounting a display unit, with the mounting arrangement providing a constant compressive force to support the display unit.

Traditional sliding joints lack a constant compression to facilitate sliding one body relative to another. Such sliding joints are at risk of wearing out over time, thus yielding a poor mounting system for crucial machine components. A need exists for a sliding joint with a constant compression provided by an appropriate durometer or stiffness of the materials used in the sliding joint, which would allow for a wide range of frictional characteristics of the sliding joint.

SUMMARY OF THE INVENTION

A mounting arrangement, for slidably mounting a display unit, includes a first bracket, having a first face and a second face, and first and second holes extending through the first bracket from the first face to the second face. The first face of the first bracket is attachable to the display unit adjacent to the display unit. A second bracket has a third face and a fourth face, and includes a slot spanning at least a portion of a width of the second bracket. The slot extends from the third face to the fourth face. A pair of first and second nylon washers each has a central hole. A pair of third and fourth nylon washers each has a central hole. A pair of first and second resilient washers each has a central hole, with the resilient washers having a resiliency greater than a resiliency of each of the first, second, third and fourth nylon washers. A pair of fifth and sixth washers each has a central hole. At least first and second bolts each have a head and a threaded shaft, with the bolts extending through the respective holes in the first bracket, the respective holes of the first and second nylon washers, the slot of the second bracket, the respective holes of the third and fourth nylon washers, the respective holes of the first and second resilient washers and the respective holes of the fifth and sixth washers. The third face of the second bracket frictionally engages the first and second nylon washers, the fourth face of the second bracket frictionally engages the third and fourth nylon washers, and the first and second resilient washers are each located between the respective first, second, third, and fourth nylon washers and the fifth and sixth washers. A pair of first and second nuts engages the respective threads of the first and second bolts such that the first and second resilient washers are compressed with a respective compressive force between the respective nylon washers to support the first bracket and the second bracket relative to each other and permit the first bracket and the second bracket to slide relative to each other.

A mounting arrangement, for slidably mounting a display unit, includes a first bracket, having a first face and a second face, and first and second holes extending through the first bracket from the first face to the second face. The first face of the first bracket is attachable to the display unit adjacent to the display unit. A second bracket has a third face and a fourth face, with the second bracket including a slot spanning at least a portion of a width of the second bracket. The slot extends from the third face to the fourth face. A pair of first and second nylon washers each has a central hole. A pair of third and fourth nylon washers each has a central hole. A pair of first and second polyurethane foam washers each has a central hole, with the polyurethane foam washers having a resiliency greater than a resiliency of each of the first, second, third and fourth nylon washers. A pair of fifth and sixth washers each has a central hole. At least first and second bolts each have a head and a threaded shaft, with the bolts extending through the respective holes in the first bracket, the respective holes of the first and second nylon washers, the slot of the second bracket, the respective holes of the third and fourth nylon washers, the respective holes of the first and second polyurethane foam washers and the respective holes of the fifth and sixth washers. The third face of the second bracket frictionally engages the first and second nylon washers, the fourth face of the second bracket frictionally engages the third and fourth nylon washers, and the first and second polyurethane foam washers are each located between the respective first, second, third, and fourth nylon washers and the fifth and sixth washers. A pair of first and second nuts engages the respective threads of the first and second bolts such that the first and second polyurethane foam washers are compressed with a respective compressive force between the respective nylon washers to support the first bracket and the second bracket relative to each other and permit the first bracket and the second bracket to slide relative to each other.

A mounting arrangement, for slidably mounting a display unit, includes a first bracket, having a first face and a second face, and first and second holes extending through the first bracket from the first face to the second face. The first face of the first bracket is attachable to the display unit adjacent to the display unit. A second bracket has a third face and a fourth face, with the second bracket including a slot spanning at least a portion of a width of the second bracket. The slot extends from the third face to the fourth face. A pair of first and second rigid nylon washers each has a central hole. A pair of third and fourth rigid nylon washers each has a central hole. A pair of first and second polyurethane foam washers each has a central hole, with the polyurethane foam washers having a resiliency greater than a resiliency of each of the first, second, third and fourth rigid nylon washers. A pair of fifth and sixth rigid nylon washers each has a central hole. at least first and second bolts each have a head and a threaded shaft, with the bolts extending through the respective holes in the first bracket, the respective holes of the first and second rigid nylon washers, the slot of the second bracket, the respective holes of the third and fourth rigid nylon washers, the respective holes of the first and second polyurethane foam washers and the respective holes of the fifth and sixth rigid nylon washers. The third face of the second bracket frictionally engages the first and second rigid nylon washers, the fourth face of the second bracket frictionally engages the third and fourth rigid nylon washers, and the first and second polyurethane foam washers are each located between the respective first, second, third, and fourth rigid nylon washers and the fifth and sixth rigid nylon washers. A pair of first and second nuts engages the respective threads of the first and second bolts such that the first and second polyurethane foam washers are compressed with a respective compressive force between the respective rigid nylon washers to support the first bracket and the second bracket relative to each other and permit the first bracket and the second bracket to slide relative to each other.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Figure 1:
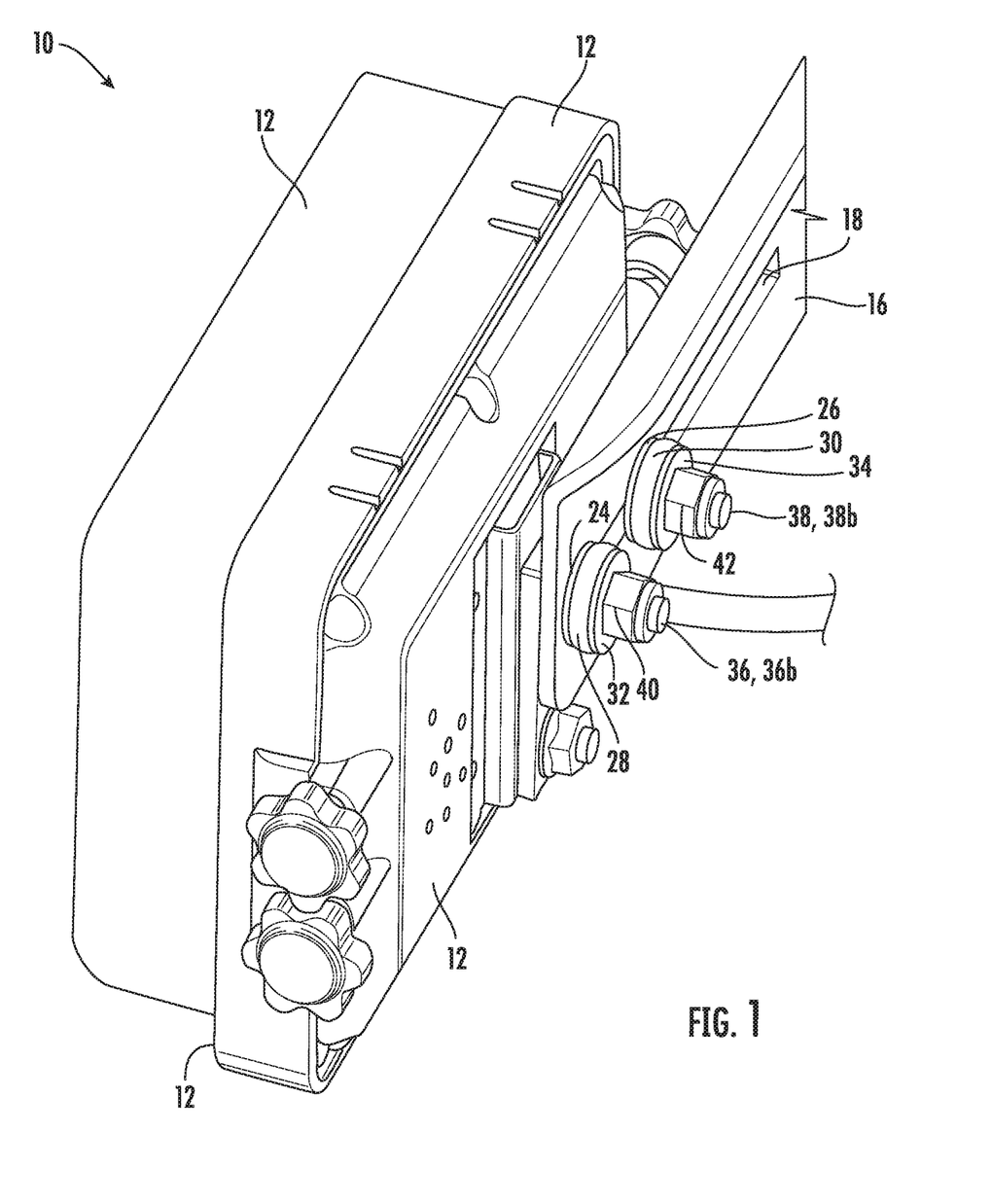
FIG. 1 is a rear-top perspective view of a mounting arrangement, according to an exemplary embodiment.
Figure 2:
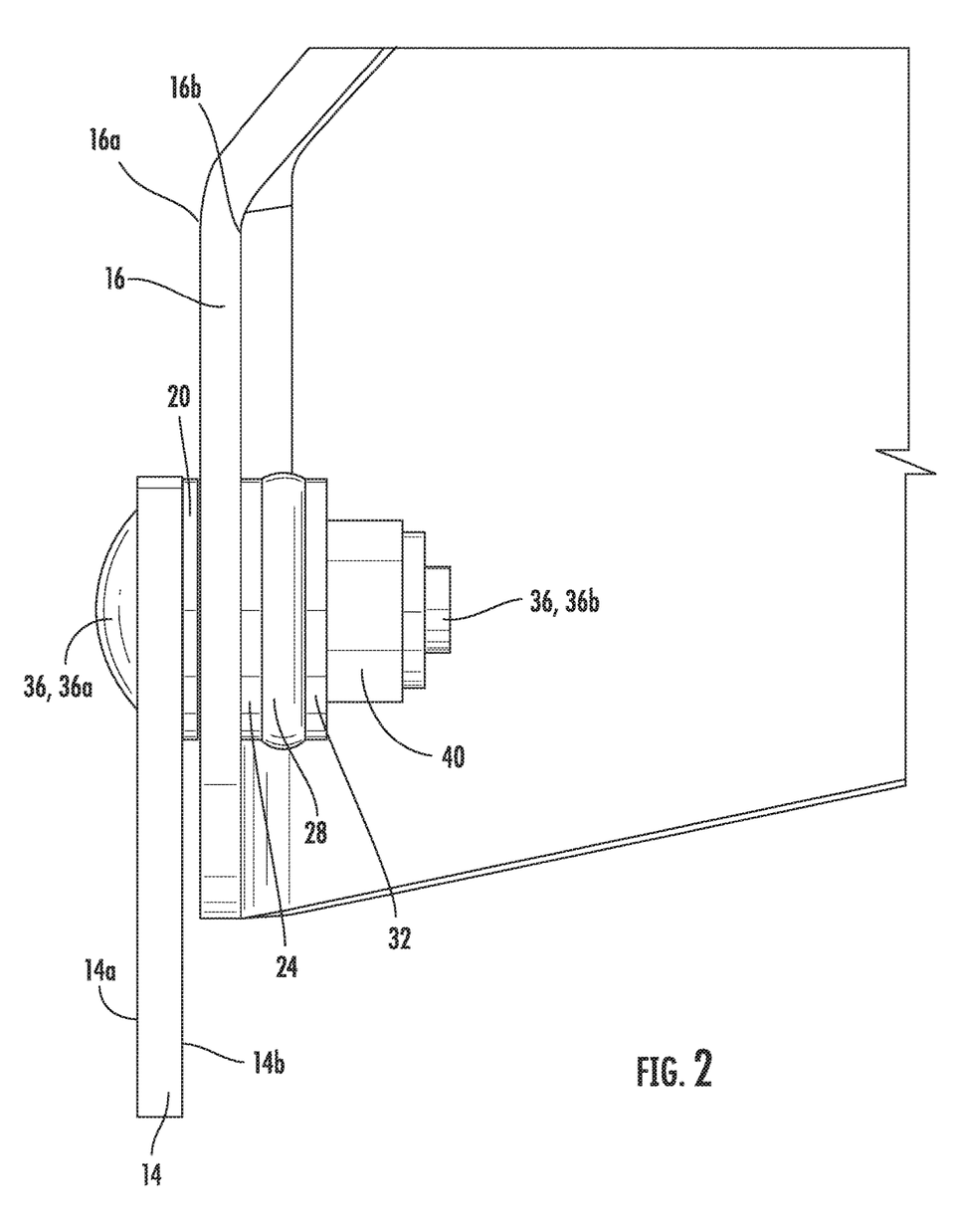
FIG. 2 is a right side view of a section of the mounting arrangement of FIG. 1, according to an exemplary embodiment.
Figure 3:
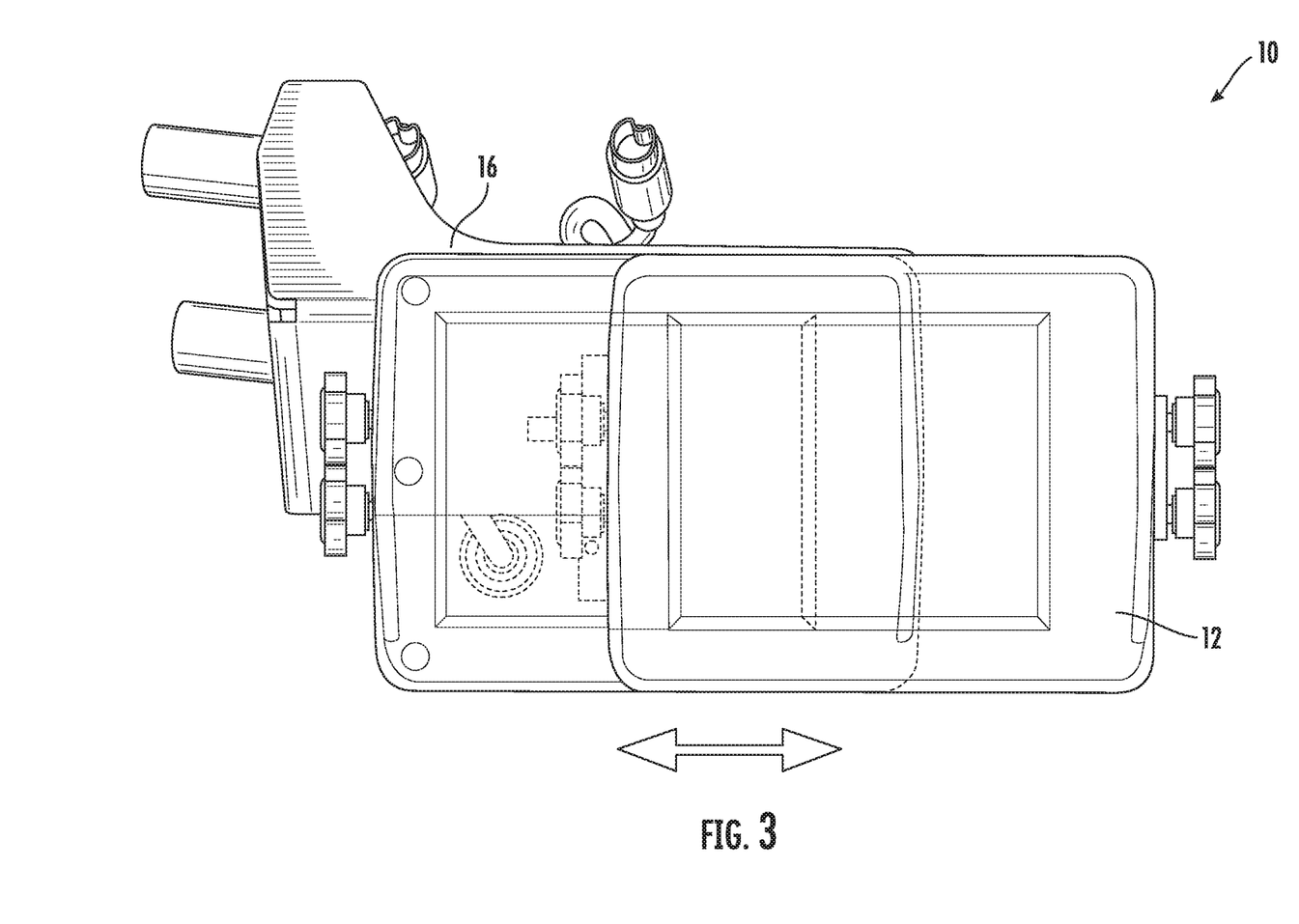
FIG. 3 is a front view of the mounting arrangement of FIG. 1, according to an exemplary embodiment.

Referring first to FIGS. 1-3, in an embodiment, a mounting arrangement 10, for slidably mounting a display unit 12, includes a first bracket 14, having a first face 14a and a second face 14b, and first and second holes (not shown) that extend through the first bracket 14 from the first face 14a to the second face 14b. The first face 14a of the first bracket 14 is attachable to the display unit 12 and is adjacent to the display unit 12.

The mounting arrangement 10 also includes a second bracket 16 having a third face 16a and a fourth face 16b. The second bracket 16 includes a slot 18 that spans at least a portion of a width 16c (FIGS. 4 and 5) of the second bracket 16, and extends from the third face 16a to the fourth face 16b of the second bracket 16.

Figure 4:
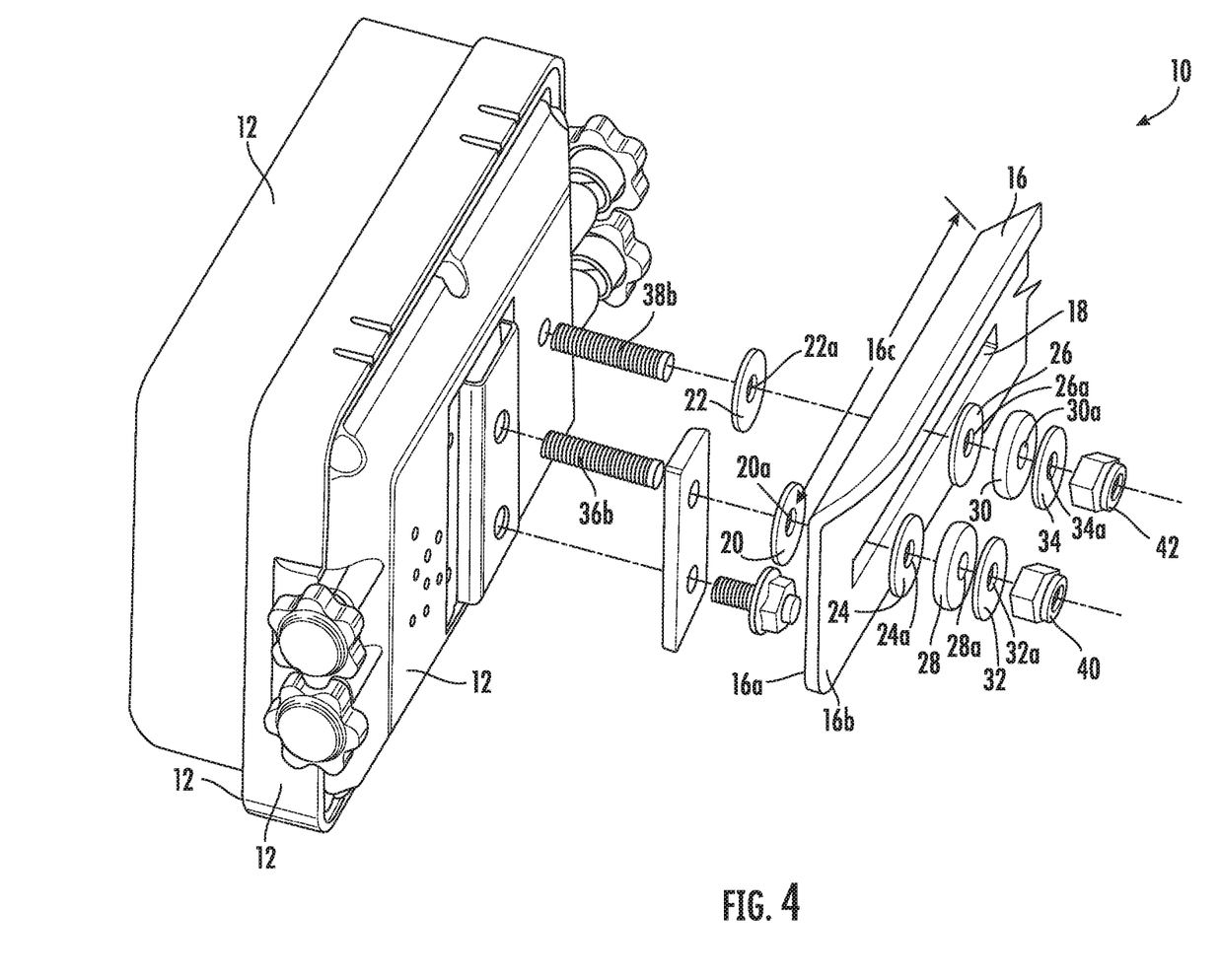
FIG. 4 is an exploded view of the mounting arrangement of FIG. 1, according to an exemplary embodiment.
Figure 5:
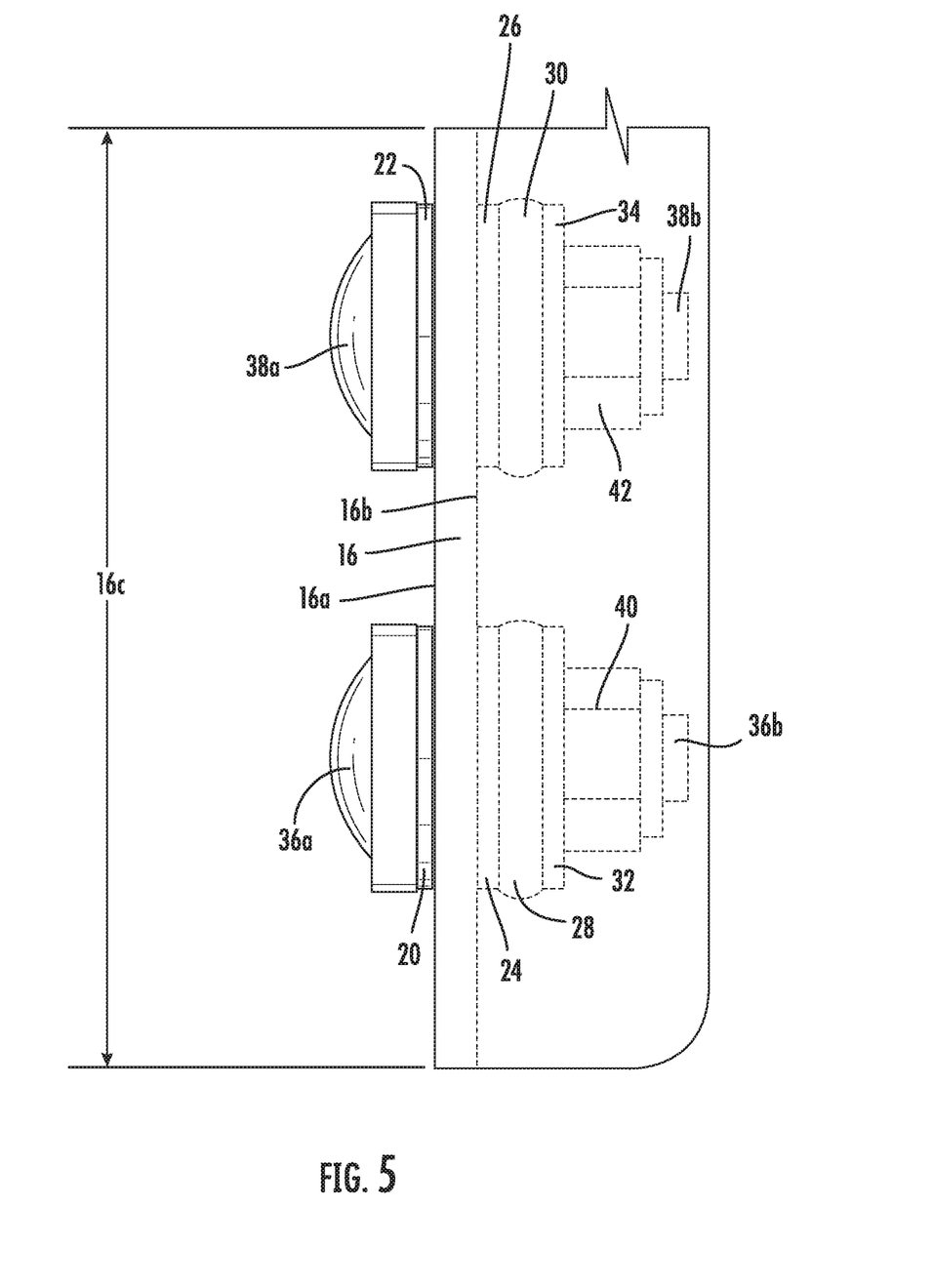
FIG. 5 is a top view of a section of the mounting arrangement of FIG. 1, according to an exemplary embodiment.
Figure 6:
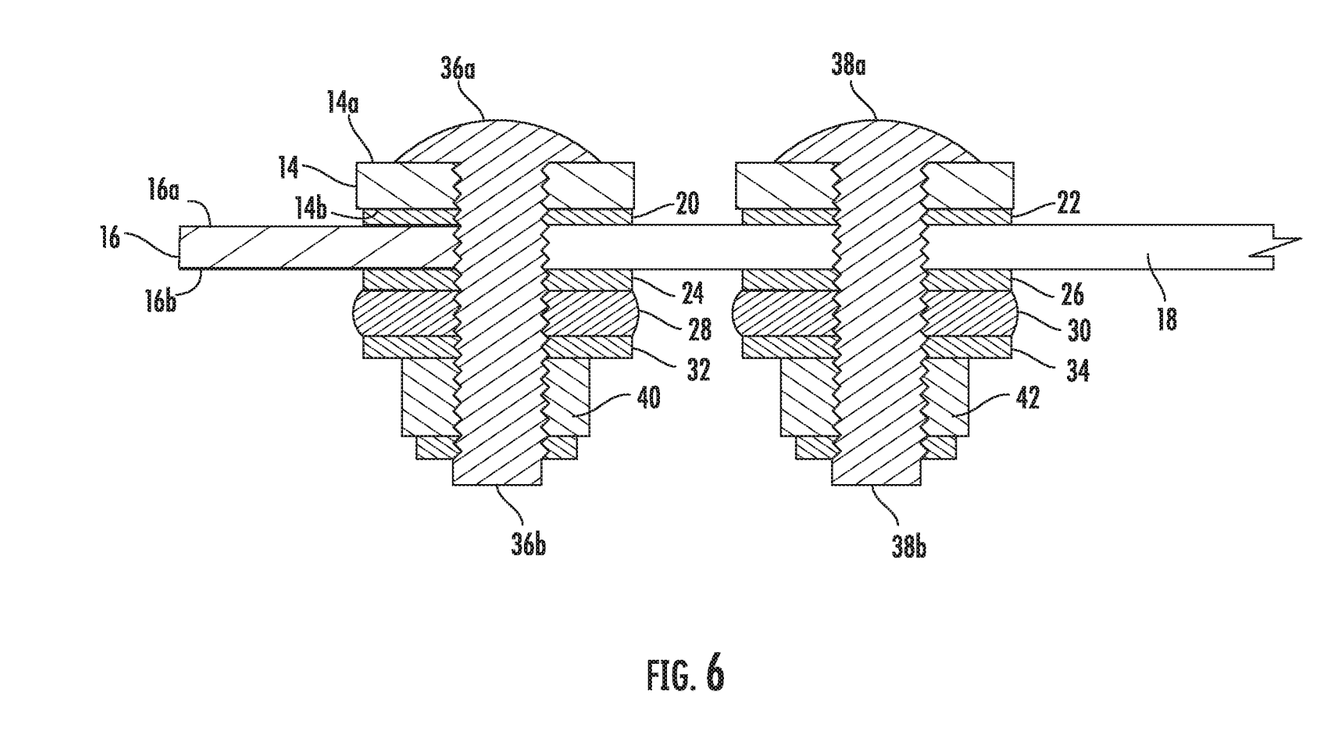
FIG. 6 is a cross-sectional view of FIG. 5, according to an exemplary embodiment.
Figure 7:
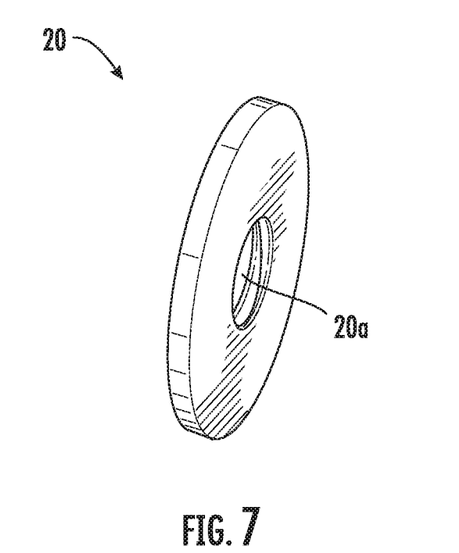
FIG. 7 is a perspective view of a nylon washer, according to an exemplary embodiment.
Figure 8:
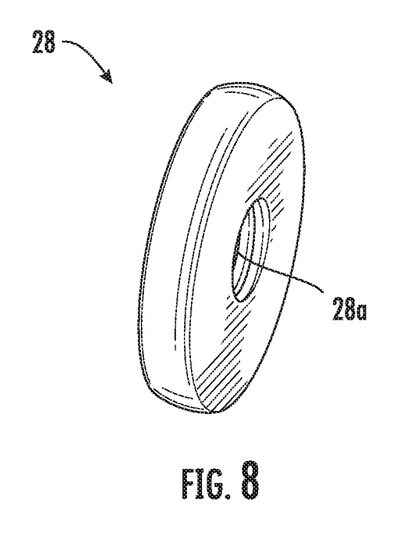
FIG. 8 is a perspective view of a polyurethane washer, according to an exemplary embodiment.

Further included in the mounting arrangement 10 are a series of washers, illustrated in FIGS. 4-6. A first and second nylon washer 20, 22 each has a central hole 20a, 22a (FIG. 4). FIG. 7 depicts a representative first nylon washer 20 with a central hole 20a. A third and fourth nylon washer 24, 26 also each has a central hole 24a, 26a (FIG. 4). A first and second resilient washer 28, 30 also each has a central hole 28a, 30a. FIG. 8 shows a representative first resilient washer 28 with a central hole 28a. The resilient washers 28, 30 each have a resiliency greater than that of the first, second, third and fourth nylon washers 20, 22, 24, 26. Further included are a fifth and sixth washer 32, 34 that each have a central hole 32a, 34a (FIG. 4).

The mounting arrangement 10 also includes at least first and second bolts 36, 38 each having a head 36a, 38a and a threaded shaft 36b, 38b (FIGS. 1-2, 4-6). FIG. 4 illustrates that the bolts 36, 38 extend through the respective holes in the first bracket 14, the respective holes of the first and second nylon washers 20, 22, the slot 18 of the second bracket 16, the respective holes of the third and fourth nylon washers 24, 26, the respective holes of the first and second resilient washers 28, 30, and the respective holes of the fifth and sixth washers 32, 34. As depicted in FIG. 6, the bolts 36, 38 are arranged such that the third face 16a of the second bracket 16 frictionally engages the first and second nylon washers 20, 22, the fourth face 16b of the second bracket 16 frictionally engages the third and fourth nylon washers 24, 26, and the first and second resilient washers 28, 30 are each located between the respective third and fourth nylon washers 24, 26 and the fifth and sixth washers 32, 34.

Additionally shown in FIGS. 1, 2, and 4-6, first and second nuts 40, 42 engage the respective threads of the first and second bolts 36, 38 such that the first and second resilient washers 28, 30 are compressed with a respective compressive force between the respective nylon washers 20, 22, 24, 26 to support the first bracket 14 and the second bracket 16 relative to each other and permit the first bracket 14 and the second bracket 16 to slide relative to each other. In an embodiment, illustrated in FIG. 4, the first and second nuts 40, 42 each has a nylon end portion.

In another embodiment of the mounting arrangement 10, one, some, or all of the first nylon washer 20, the second nylon washer 22, the third nylon washer 24, and the fourth nylon washer 26 comprises rigid nylon. The term "rigid nylon" is defined herein as having a durometer ranging from 50 Shore D to 100 Shore D.

In a further embodiment of the mounting arrangement 10, either or both of the first bracket 14 and the second bracket 16 is statically supported within an operator cab (not shown) of a construction vehicle (not shown).

In yet another embodiment of the mounting arrangement 10, the first and second resilient washers 28, 30 are formed from polyurethane foam.

In yet a further embodiment of the mounting arrangement 10, both the fifth and sixth washers 32, 34 are formed from nylon. In a specific embodiment, both the fifth and sixth washers 32, 34 are formed from rigid nylon.

Referring to the figures as above, in an embodiment, a mounting arrangement 10, for slidably mounting a display unit 12, includes a first bracket 14 having a first face 14a and a second face 14b, and first and second holes (not shown) extending through the first bracket 14 from the first face 14a to the second face 14b. The first face 14a of the first bracket 14 is attachable to the display unit 12 and is adjacent to the display unit 12.

The mounting arrangement 10 further includes a second bracket 16 having a third face 16a and a fourth face 16b. The second bracket 16 includes a slot 18 that spans at least a portion of a width 16c of the second bracket 16, and extends from the third face 16a to the fourth face 16b of the second bracket 16.

The mounting arrangement 10 also includes a series of washers. A first and second nylon washer 20, 22 each has a central hole 20a, 22a. A third and fourth nylon washer 24, 26 each has a central hole 24a, 26a. A first and second polyurethane foam washer 28, 30 each has a central hole 28a, 30a. The polyurethane foam washers 28, 30 both have a resiliency greater than a resiliency of each of the first, second, third and fourth nylon washers 20, 22, 24, 26. Further included are a fifth and sixth washer 32, 34 that each have a central hole 32a, 34a.

Furthermore, the mounting arrangement 10 includes at least first and second bolts 36, 38 each having a head 36a, 38a and a threaded shaft 36b, 38b. The bolts 36, 38 extend through the respective holes in the first bracket 14, the respective holes of the first and second nylon washers 20, 22, the slot 18, the respective holes of the third and fourth nylon washers 24, 26, the respective holes of the first and second polyurethane foam washers 28, 30, and the respective holes of the fifth and sixth washers 32, 34. The bolts 36, 38 are arranged such that the third face 16a of the second bracket 16 frictionally engages the first and second nylon washers 20, 22, the fourth face 16b of the second bracket 16 frictionally engages the third and fourth nylon washers 24, 26, and the first and second polyurethane foam washers 28, 30 are each located between the respective third and fourth nylon washers 24, 26 and the fifth and sixth washers 32, 34.

Also included are first and second nuts 40, 42 that engage the respective threads of the first and second bolts 36, 38 such that the first and second polyurethane foam washers 28, 30 are compressed with a respective compressive force between the respective nylon washers 20, 22, 24, 26 to support the first bracket 14 and the second bracket 16 relative to each other and permit the first bracket 14 and the second bracket 16 to slide relative to each other. In an embodiment, the first and second nuts 40, 42 each has a nylon end portion.

In yet another embodiment of the mounting assembly 10, the first, second, third, and fourth washers 20, 22, 24, 26 are each formed from rigid nylon.

In yet a further embodiment of the mounting assembly 10, the fifth and sixth washers 32, 34 are each formed from nylon. In a specific embodiment of the mounting assembly 10, the fifth and sixth washers 32, 34 are each formed from rigid nylon.

Referring again to the figures as above, in an embodiment, a mounting arrangement 10, for slidably mounting a display unit 12, includes a first bracket 14, having a first face 14a and a second face 14b, and first and second holes (not shown) extending through the first bracket 14 from the first face 14a to the second face 14b. The first face 14a of the first bracket 14 is attachable to the display unit 12 and adjacent to the display unit 12.

The mounting arrangement 10 also includes a second bracket 16 having a third face 16a and a fourth face 16b. The second bracket 16 includes a slot 18 that spans at least a portion of a width 16c of the second bracket 16, and extends from the third face 16a to the fourth face 16b.

Further, the mounting arrangement 10 includes a series of washers. A first and second rigid nylon washer 20, 22 each has a central hole 20a, 22a. A third and fourth rigid nylon washer 24, 26 each has a central hole 24a, 26a. A first and second polyurethane foam washers 28, 30 each has a central hole 28a, 30a. The polyurethane foam washers 28, 30 each has a resiliency greater than a resiliency of each of the first, second, third and fourth rigid nylon washers 20, 22, 24, 26. A fifth and sixth rigid nylon washer 32, 34 each has a central hole 32a, 34a.

The mounting arrangement 10 additionally includes at least first and second bolts 36, 38 each having a head 36a, 38a and a threaded shaft 36b, 38b. The bolts 36, 38 extend through the respective holes in the first bracket 14, the respective holes of the first and second rigid nylon washers 20, 22, the slot 18, the respective holes of the third and fourth rigid nylon washers 24, 26, the respective holes of the first and second polyurethane foam washers 28, 30, and the respective holes of the fifth and sixth rigid nylon washers 32, 34. The bolts 36, 38 are arranged such that the third face 16a of the second bracket 16 frictionally engages the first and second rigid nylon washers 20, 22, the fourth face 16b of the second bracket 16 frictionally engages the third and fourth rigid nylon washers 24, 26, and the first and second polyurethane foam washers 28, 30 are each located between the respective third and fourth rigid nylon washers 24, 26 and the fifth and sixth rigid nylon washers 32, 34.

Furthermore, first and second nuts 40, 42 engage the respective threads of the first and second bolts 36, 38 such that the first and second polyurethane foam washers 28, 30 are compressed with a respective compressive force between the respective rigid nylon washers 20, 22, 24, 26 to support the first bracket 14 and the second bracket 16 relative to each other and permit the first bracket 14 and the second bracket 16 to slide relative to each other. In an embodiment, the first and second nuts 40, 42 each has a nylon end portion.

In another embodiment of the mounting assembly 10, the second bracket 16 is statically supported within an operator cab (not shown) of a construction vehicle (not shown).

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more than one component or element, and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another, or with the two members and any additional member being attached to one another. Such joining may be permanent in nature or alternatively may be removable or releasable in nature. Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A mounting arrangement, for slidably mounting a display unit, comprising:
   a first bracket, having a first face and a second face, and first and second holes extending through the first bracket from the first face to the second face, the first face of the first bracket being attachable to the display unit adjacent to the display unit;
   a second bracket having a third face and a fourth face, the second bracket including a slot spanning at least a portion of a width of the second bracket, and extending from the third face to the fourth face,
   first and second nylon washers each having a central hole;
   third and fourth nylon washers each having a central hole;
   first and second resilient washers each having a central hole, the resilient washers having a resiliency greater than a resiliency of each of the first, second, third and fourth nylon washers;
   fifth and sixth washers each having a central hole;
   at least first and second bolts each having a head and a threaded shaft, the bolts extending through the respective holes in the first bracket, the respective holes of the first and second nylon washers, the slot of the second bracket, the respective holes of the third and fourth nylon washers, the respective holes of the first and second resilient washers and the respective holes of the fifth and sixth washers such that the third face of the second bracket frictionally engages the first and second nylon washers, the fourth face of the second bracket frictionally engages the third and fourth nylon washers, and the first and second resilient washers are each located between the respective third and fourth nylon washers and the fifth and sixth washers; and
   first and second nuts engaging the respective threads of the first and second bolts such that the first and second resilient washers are compressed with a respective compressive force between the respective nylon washers to support the first bracket and the second bracket relative to each other and permit the first bracket and the second bracket to slide relative to each other.

2. The assembly of claim 1, wherein the first washer comprises rigid nylon.

3. The assembly of claim 1, wherein the second washer comprises rigid nylon.

4. The assembly of claim 1, wherein the third washer comprises rigid nylon.

5. The assembly of claim 1, wherein the fourth washer comprises rigid nylon.

6. The assembly of claim 1, wherein the second bracket is statically supported within an operator cab of a construction vehicle.

7. The assembly of claim 1, wherein the first bracket is statically supported within an operator cab of a construction vehicle.

8. The assembly of claim 1, the first and second resilient washers are formed from polyurethane foam.

9. The assembly of claim 1, wherein the first washer and the third washer each comprise rigid nylon.

10. The assembly of claim 1, wherein the second washer and the fourth washer each comprise rigid nylon.

11. The assembly of claim 1, wherein the first washer, the second washer, the third washer, and the fourth washer each comprise rigid nylon.

12. The assembly of claim 2, wherein the fifth and sixth washers each comprise nylon.

13. The assembly of claim 12, wherein the fifth and sixth washers each comprise rigid nylon.

14. The assembly of claim 13, wherein the second washer, the third washer, and the fourth washer each comprise rigid nylon.

15. A mounting arrangement, for slidably mounting a display unit, comprising:
   a first bracket, having a first face and a second face, and first and second holes extending through the first bracket from the first face to the second face the first face of the first bracket being attachable to the display unit adjacent to the display unit;
   a second bracket having a third face and a fourth face, the second bracket including a slot spanning at least a portion of a width of the second bracket, and extending from the third face to the fourth face,
   first and second nylon washers each having a central hole;
   third and fourth nylon washers each having a central hole;
   first and second polyurethane foam washers each having a central hole, the polyurethane foam washers having a resiliency greater than a resiliency of each of the first, second, third and fourth nylon washers;
   fifth and sixth washers each having a central hole;
   at least first and second bolts each having a head and a threaded shaft, the bolts extending through the respective holes in the first bracket, the respective holes of the first and second nylon washers, the slot of the second bracket, the respective holes of the third and fourth nylon washers, the respective holes of the first and second polyurethane foam washers and the respective holes of the fifth and sixth washers such that the third face of the second bracket frictionally engages the first and second nylon washers, the fourth face of the second bracket frictionally engages the third and fourth nylon washers, and the first and second polyurethane foam washers are each located between the respective third and fourth nylon washers and the fifth and sixth washers; and
   first and second nuts engaging the respective threads of the first and second bolts such that the first and second polyurethane foam washers are compressed with a respective compressive force between the respective nylon washers to support the first bracket and the second bracket relative to each other and permit the first bracket and the second bracket to slide relative to each other.

16. The mounting arrangement of claim 15, wherein the first, second, third, and fourth washers each comprises rigid nylon.

17. The mounting arrangement of claim 15, wherein the fifth and sixth washers each comprise nylon.

18. The mounting arrangement of claim 17, wherein the fifth and sixth washers each comprise rigid nylon.

19. A mounting arrangement, for slidably mounting a display unit, comprising:
- a first bracket, having a first face and a second face, and first and second holes extending through the first bracket from the first face to the second face the first face of the first bracket being attachable to the display unit adjacent to the display unit;
- a second bracket having a third face and a fourth face, the second bracket including a slot spanning at least a portion of a width of the second bracket, and extending from the third face to the fourth face,
- first and second rigid nylon washers each having a central hole;
- third and fourth rigid nylon washers each having a central hole;
- first and second polyurethane foam washers each having a central hole, the polyurethane foam washers having a resiliency greater than a resiliency of each of the first, second, third and fourth rigid nylon washers;
- fifth and sixth rigid nylon washers each having a central hole;
- at least first and second bolts each having a head and a threaded shaft, the bolts extending through the respective holes in the first bracket, the respective holes of the first and second rigid nylon washers, the slot of the second bracket, the respective holes of the third and fourth rigid nylon washers, the respective holes of the first and second polyurethane foam washers and the respective holes of the fifth and sixth rigid nylon washers such that the third face of the second bracket frictionally engages the first and second rigid nylon washers, the fourth face of the second bracket frictionally engages the third and fourth rigid nylon washers, and the first and second polyurethane foam washers are each located between the respective third and fourth rigid nylon washers and the fifth and sixth rigid nylon washers; and
- first and second nuts engaging the respective threads of the first and second bolts such that the first and second polyurethane foam washers are compressed with a respective compressive force between the respective rigid nylon washers to support the first bracket and the second bracket relative to each other and permit the first bracket and the second bracket to slide relative to each other.

20. The assembly of claim 19, wherein the second bracket is statically supported within an operator cab of a construction vehicle.

* * * * *